Figure 1:
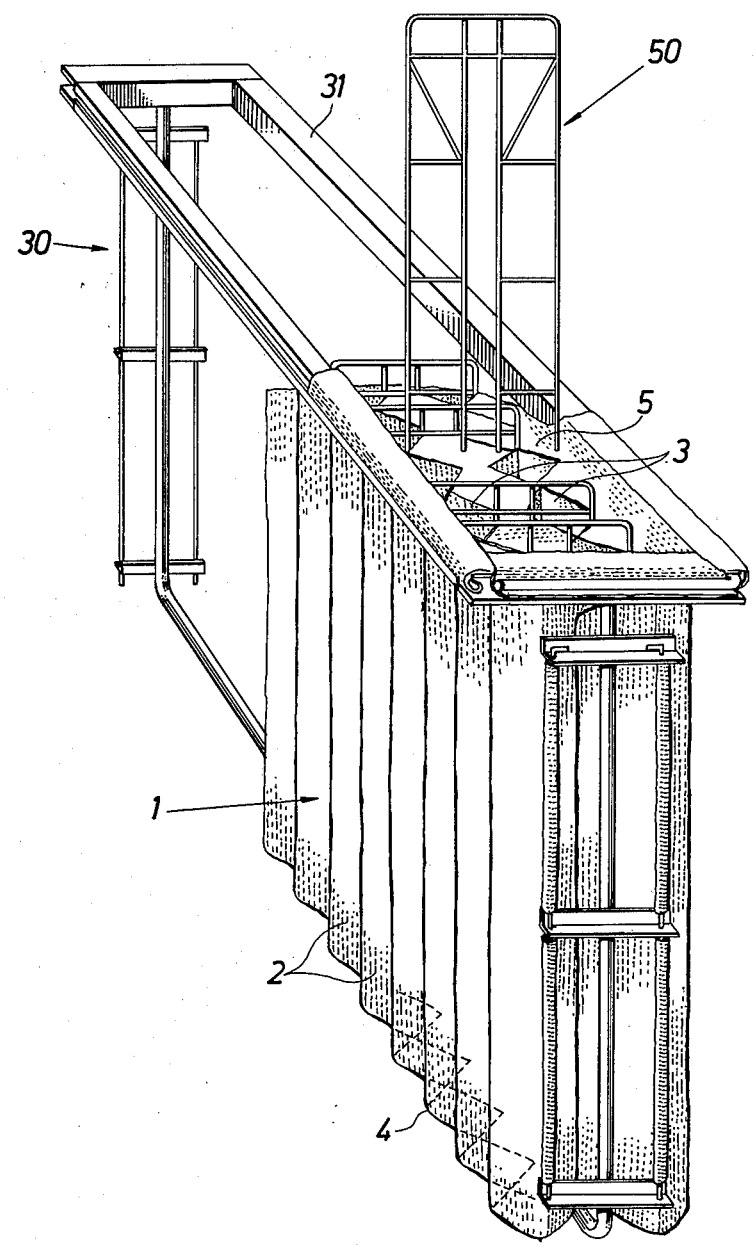

United States Patent [19]

Andersson et al.

[11] 4,123,239
[45] Oct. 31, 1978

[54] FILTER IN A CASSETTE FRAME

[75] Inventors: Rune S. Andersson, Växjö; Svante O. Berglund, Hovmantorp, both of Sweden

[73] Assignee: Aktiebolgatet Svenska Flaktfabriken, Nacka, Sweden

[21] Appl. No.: 828,426

[22] Filed: Aug. 29, 1977

[30] Foreign Application Priority Data

Aug. 31, 1976 [SE] Sweden .............................. 7609625

[51] Int. Cl.$^2$ ............................................. B01D 46/02
[52] U.S. Cl. ......................................... 55/379; 55/483; 55/500; 55/381
[58] Field of Search ................ 55/378, 379, 381, 483, 55/484, 500–502, 507, 509, 511

[56] References Cited

U.S. PATENT DOCUMENTS

| | | | |
|---|---|---|---|
| 3,606,740 | 9/1971 | Ballennie | 55/500 |
| 3,844,749 | 10/1974 | Carter, Sr. | 55/378 |
| 3,880,628 | 4/1975 | Gustavsson et al. | 55/500 |

*Primary Examiner*—Bernard Nozick
*Attorney, Agent, or Firm*—Dann, Dorfman, Herrell and Skillman

[57] ABSTRACT

A bag-type filter having a removable filter element, said element being mounted in a cassette frame which may be inserted and removed from the filter housing. The filter element has a plurality of tubular sleeves which are open at the top and closed at the bottom to provide elongated gas passageways surrounded by filter material. The cassette frame includes stiffening members positioned within said sleeves and a rectangular frame surrounding the top of the filter element. The filter element is suspended from said rectangular frame and is releasably clamped to the frame. The cassette frame has a lower structure which may support the cassette outside the housing and provide reinforcement for the cassette. The stiffening members include elements engaged in the sleeves to hold them open, the elements comprising a wire lattice having offset guide portions adapted to engage in the closed bottoms of the sleeves. The lower structure of the cassette frame includes end walls which engage the sleeves and cooperate with the stiffening members in maintaining the passageways open.

4 Claims, 7 Drawing Figures

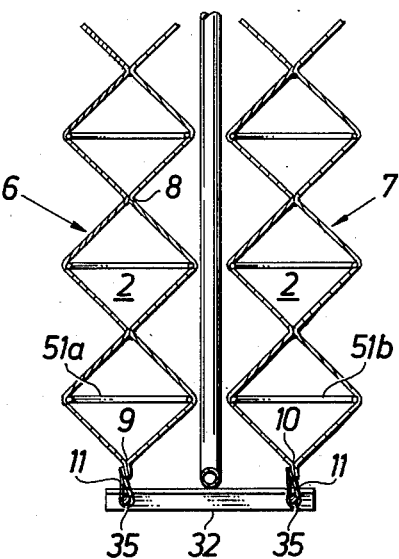
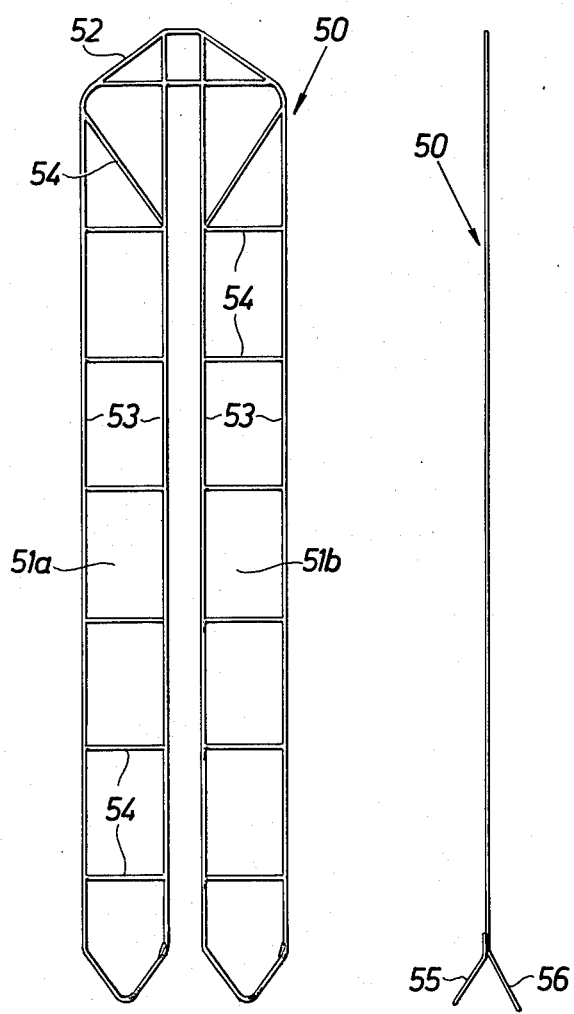
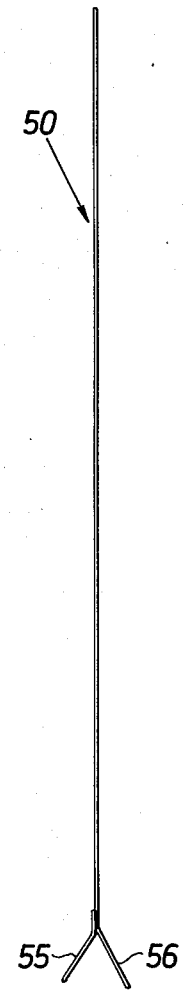
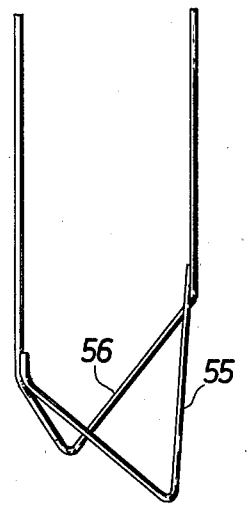

FILTER IN A CASSETTE FRAME

This invention relates to a device for mounting a compact filter element in a cassette frame. The invention is particularly related to a cassette having stiffener elements adapted to maintain open a filter element formed of a plurality of tubular sleeves or bags providing gas passageways.

Filter means of this kind are used for cleaning gases from dust. The compact filter is clamped in a cassette frame, which is inserted in a filter housing. The dust-loaded gas is introduced into a rawgas chamber and passes through the filter material whereby the dust is deposited on the surface of said material. The cleaned gas leaves the filter housing via a clean-gas chamber, which can be common to several compact filters. Between the cassette frame and filter housing an efficient sealing must be provided to ensure that all gas on its way from the raw-gas chamber to the clean-gas chamber passes through the filter material. For ensuring efficient operation of the filter, the dust collected on the filter material must be removed regularly.

According to known technique, the dust is removed by subjecting the filter material to vibration movements, which usually are brought about by pressure pulses of a suitable gas, usually air. The filter material in operation is exposed to varying wear in response to gas load, dust concentration, dust type and cleaning process. Satisfactory operation of the filter presupposes regular inspections and, if necessary, exchange of the filter material. It is, therefore, essential that the inspection can be carried out easily and the filter tubes be exchanged simply and rapidly, so that the filter section concerned must not be taken out of operation for a long period. Conventional filters do not meet these requirements. In such known installations, the exchange of filters is a tedious and heavy work, which often requires several persons, and the manufacturing, transportation and storage costs for the filters and their spare parts are high in view of their complicated, bulky and heavy structural design. Owing to these factors, the filter process on the whole often requires large resources or does not operate satisfactorily.

The present invention has the object to eliminate the aforesaid disadvantages and produce a filter means of the above kind, which is of simple and lightweight design, the parts of which are non-expensive to manufacture, transport and store, and the filter bags of which, if necessary, can be exchanged rapidly and easily by one man. This object is achieved by a device of the present invention including the several embodiments thereof. Due to the fact, that the compact filter with associated cassette frame is provided with two rows of filter bags, a well-balanced relation between size and required number of cassettes is obtained, i.e. a cassette with filter is not greater or heavier than one person alone can manage in effecting a filter exchange, at the same time the cassette filter unit having a relatively high cleaning capacity (square meter filter surface) for the gas to be cleaned. Obviously, when using small cassettes, a greater number thereof is required, which would increase the manufacturing costs for the entire filter. Owing to the design of the cassette frame with two end wall pieces, which rigidly are interconnected and provided with clamping means for each filter bag row, a cassette frame structure is obtained which is of light weight, but seen in the longitudinal direction of the cassette frame also is stiff. This stiffness renders possible to stably attach the end surface of each bag row, which attachment can be released easily owing to the design of the clamping means. The stable attachment in longitudinal direction, in combination with the double rows of filter bags, permits the filter bags be stretched by substantially plane stiffening members, which owing to their design distinctively are self-fixing in their respective filter bags. Due to their simple shape, the stiffening members can be manufactured, transported and handled with ease and at low costs. The configuration of cassette frame, compact filter and stiffening members according to the invention, thus, is a clear progress of the known state of art.

Figure 2:
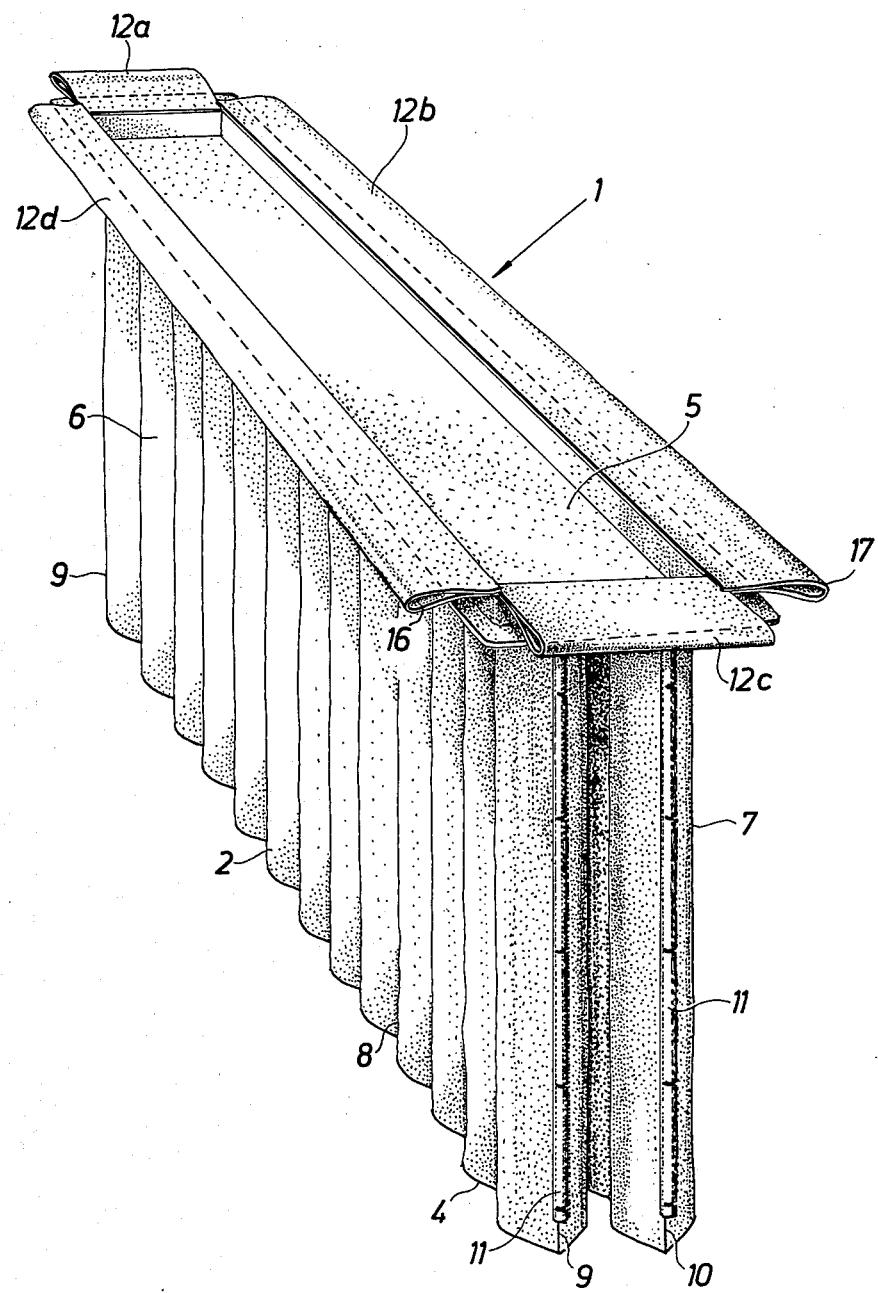
Figure 3:
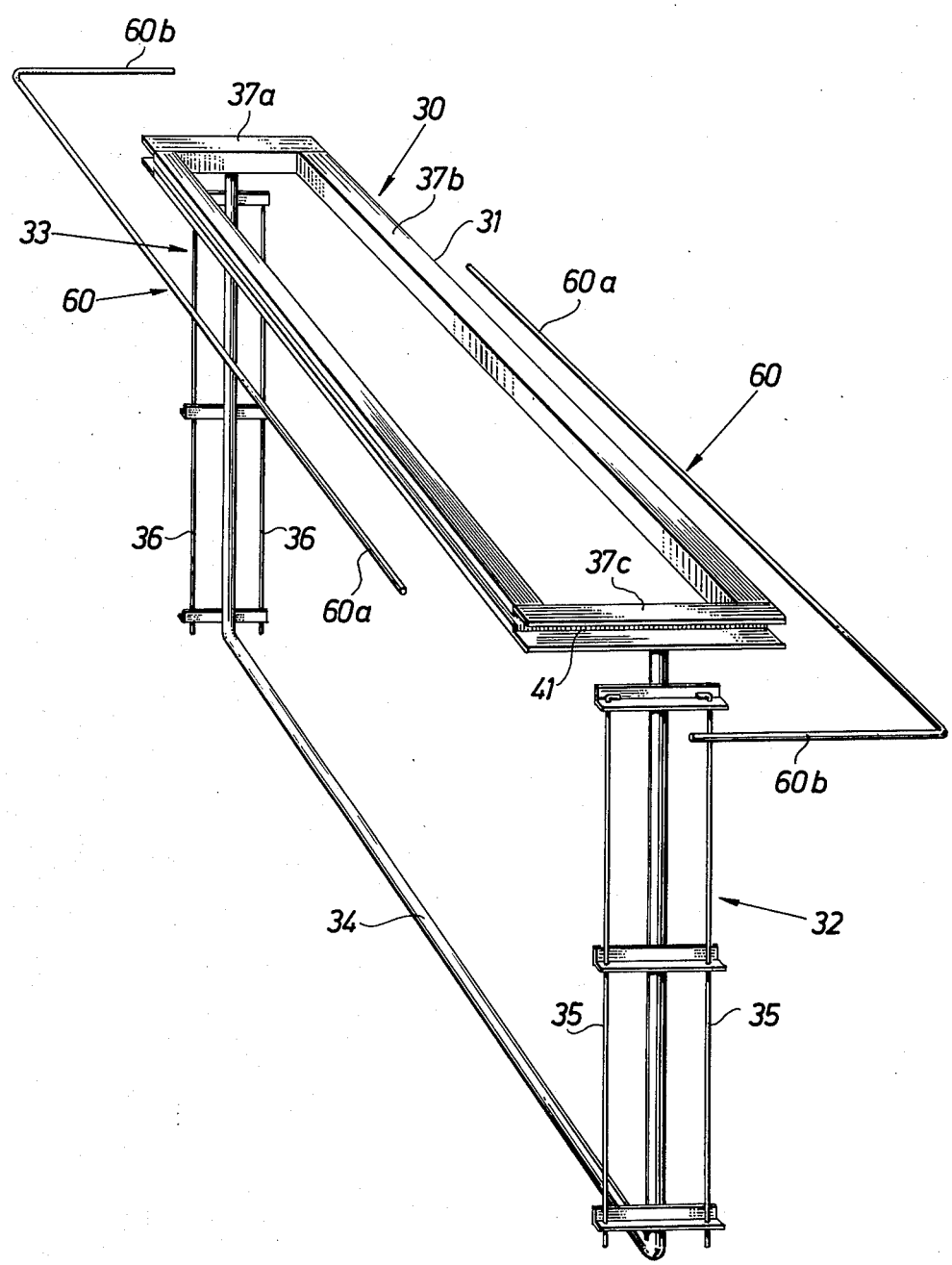

The invention is described in greater detail in the following description, with reference to the accompanying drawings, in which FIG. 1 is a view of a compact filter clamped in a cassette frame, FIG. 2 is a view of the compact filter, without illustrating the passageways therein, FIG. 3 is a view of the cassette frame without the compact filter and stiffening element, FIGS. 4 a-c show the stiffening element, FIG. 5 is a horizontal section of the compact filter clamped in the cassette frame.

In FIG. 1, the numeral 1 designates a compact filter comprising a plurality of filter bags 2, which constitute clean-gas passageways 3 for the cleaned gas. The passageways are closed at the lower portion 4 of the filter bags and at the upper portion of the filter form a common clean-gas opening 5. The compact filter is mounted in a cassette frame 30 consisting of a rectangular frame 31, which comprises means for mounting the compact filter in the cassette frame. The configuration of cassette frame and compact filter is intended to suitably be inserted in a filter housing (not shown) where the common clean-gas opening sealingly is connected to the clean-gas passageways of the filter housing. It is to be understood that one or more cassette frames with associated filters can be connected to the same filter housing. The numeral 50 designates means for stiffening the filter bags.

In FIG. 2 a view of the compact filter separated from the cassette frame is shown. The filter shown consists of filter material formed with two deep folds. Of said folds two rows 6, 7 of filter bags 2 have been formed by sewing together the folds with seams 8 in parallel with each other. At the end surfaces 9, 10 of each row members 11 are provided to clamp the filter in the cassette frame.

Said members preferably have the form of longitudinal sleeves. The compact filter is provided at its upper portion with a clean-gas opening 5 common to all filter bags and interconnecting the clean-gas passageways formed by the respective filter bag. The filter bags are closed at their lower portion 4 by an end portion. At the upper portion of the compact filter, i.e. about the common clean-gas opening 5, collars 12 a-d are provided which on at least two sides are formed with sleeves 16, 17.

In FIG. 3 a view of the cassette frame 30 is shown. The upper portion of the frame is a rectangular frame 31, at two sides of which end wall pieces 32, 33 are provided. Said end wall pieces include clamping means 35, 36 to detachably clamp each row of filter bags at its opposed end surfaces. The clamping means preferably are bars to be inserted through the end wall pieces and the longitudinal sleeves in the end members 11 of the filter bag rows. The two opposed end wall pieces 32, 33 are rigidly interconnected at their lower end by a bottom beam 34, which may be formed as shown in the Figure, i.e. the beam, preferably in the form of a tubular section, is attached to the end wall surfaces of the frame 31 and constitutes an integrated part of the end wall pieces 32, 33, forming a bow at the lower portion of the cassette frame. This bow serves as a support element for the cassette frame before its positioning in the filter housing and also renders it possible to apply a relatively great clamping pressure during the clamping of the filter bag rows, i.e. without thereby bending the end wall pieces toward each other. The rectangular frame has an U-shaped section, consisting of four elements 37 a-d, which form an outwardly-open U-shaped groove 41 extending about the frame. In the Figure also two L-shaped locking rods 60 are shown which are used for fixing the filter cells in the cassette frame.

In FIGS. 4 a-c the design of the stiffening element 50 is shown in detail. As appears from FIG. 4a, the stiffening element is provided with two legs 51a and 51b lying in plane. Their centre lines correspond to the distance between the two centre lines of the two filter rows (6, 7 in FIG. 2). The legs 51a, b of the element are interconnected by a stiffening web 52, the lateral edges 53 of which are in parallel with each other. The stiffening element according to the Figure is built up of stiff wires forming a stiffening lattice work 54. The element, of course, can be made of another material without transgressing the scope of the invention idea. FIG. 4b is a lateral view of the stiffening element 50 showing that the element is substantially plane. At the lower portions of the legs, however, V-shaped guide portions 55, 56 are formed and project from the plane of the element in general. The guide portions 55, 56 are so designed that they fit the folds forming in the bottom of the filter bags when the bags are stretched from their original plane shape to the rhombic cross-section. Hereby the lower end of both legs of the stiffening element 50 is efficiently stiffened, whereby the orientation of the legs in the filter bags remains intact during filter operation. FIG. 4c shows in detail the configuration of the guide portions 55, 56 at the lower portions of the legs. Due to the fact that one of the guide portions 55 is attached to the inside of the leg wire, several stiffening elements can be stacked for transport one into the other.

FIG. 5 is a horizontal section of the compact filter clamped in the cassette frame. In the Figure only one end wall of the cassette frame is shown. Each of the filter rows is clamped in the end wall pieces 32, 33 by bars extending through the clamping means 11, which are provided at the end surfaces 9, 10 of the filter rows and preferably consist of sleeves attached by sewing to the lateral edges of the filter bags. The filterbags are stretched by means of the stiffening elements 50, the two legs 51a and 51b of which are inserted in filter bags located to the side of each other each in a row 6, 7. The plane of the stiffening element 50, thus, lies in parallel at the end wall pieces 32. The cross-section of the filter bags, thus, in the position clamped in the cassette frame has rhombic configuration.

We claim:

1. For use in a filter housing, at least one filter cassette, and a bag-type filter element supported in said cassette, said filter element comprising a plurality of filter bags forming gas passageways which, at their lower ends are closed, and at their upper ends form a common gas opening, said cassette including a rectangular cassette frame surrounding said upper end, means for fastening the filter element in the cassette frame, and stiffening members telescopically engaged into the gas passageways formed by said bags, wherein the filter element consists of two rows of filter bags which, in the respective rows, are interconnected along their longitudinal side edges, said cassette frame at its end being provided with depending end wall pieces having clamping means detachably engaging the filter element at the ends of said rows to stretch the element, said pieces at their lower ends being rigidly connected to each other at the lower portion of the cassette frame, each of the stiffening members consisting of a substantially plane stiffening element common for two adjacent filter bags each lying in a separate one of said two rows, which element is provided with two legs lying in a plane, each positioned in a respective filter bag, the width of said leg corresponding to the width of the bag in its stretched state, the legs at their upper portions being connected to each other by a stiffening web, whereby said clamping means and stiffening elements maintain said passageways open in their stretched state.

2. A device according to claim 1, characterized in that the lower portion of the legs consists of V-shaped guide portions projecting from the plane of the stiffening element to both sides.

3. A device according to claim 1 wherein the side edges of said filter bags are formed by spaced parallel seams disposed in a plane extending longitudinal of the respective row, and wherein the side edges of the two legs of the stiffening element are parallel to each other and are mounted in plane perpendicular to the planes of the seams.

4. A device according to claim 3, characterized in that the stiffening elements are formed of stiff wires constituting the side edges of the legs, said wires being interconnected by a lattice work of wires.

* * * * *

UNITED STATES PATENT AND TRADEMARK OFFICE
CERTIFICATE OF CORRECTION

PATENT NO. : 4,123,239
DATED : October 31, 1978
INVENTOR(S) : Rune S. Andersson; Svante O. Berglund It is certified that error appears in the above-identified patent and that said Letters Patent are hereby corrected as shown below:

In the heading, the assignee should read as follows:

-- [73] Assignee: Aktiebolaget Svenska Flaktfabriken, Nacka, Sweden --

Signed and Sealed this

Fourth Day of September 1979

[SEAL]

Attest:

LUTRELLE F. PARKER

*Attesting Officer*     *Acting Commissioner of Patents and Trademarks*